US008578265B2

(12) United States Patent
Bajohr et al.

(10) Patent No.: US 8,578,265 B2
(45) Date of Patent: Nov. 5, 2013

(54) METHODS AND APPARATUS FOR GENERATING A DYNAMIC DOCUMENT

(75) Inventors: Colleen Y. Bajohr, Highland Park, IL (US); Timothy Handorf, Trevor, WI (US); Prashant Gupta, Foster City, CA (US)

(73) Assignee: BigMachines, Inc., Deerfield, IL (US)

( * ) Notice: Subject to any disclaimer, the term of this patent is extended or adjusted under 35 U.S.C. 154(b) by 692 days.

(21) Appl. No.: 12/247,039

(22) Filed: Oct. 7, 2008

(65) Prior Publication Data

US 2010/0088590 A1    Apr. 8, 2010

(51) Int. Cl.
*G06F 17/00* (2006.01)
(52) U.S. Cl.
USPC .............................. 715/235; 715/234; 715/236
(58) Field of Classification Search
USPC .......................................... 715/235, 234, 236
See application file for complete search history.

(56) References Cited

U.S. PATENT DOCUMENTS

| | | |
|---|---|---|
| 4,853,850 A | 8/1989 | Krass, Jr. et al. |
| 4,942,356 A | 7/1990 | Ellingen et al. |
| 5,060,401 A | 10/1991 | Whatley |
| 5,111,927 A | 5/1992 | Schulze, Jr. |
| 5,129,656 A | 7/1992 | Marte et al. |
| 5,225,987 A | 7/1993 | Thompson |
| 5,279,051 A | 1/1994 | Whatley |
| 5,283,865 A | 2/1994 | Johnson |
| 5,307,261 A | 4/1994 | Maki et al. |
| 5,311,424 A | 5/1994 | Mukherjee et al. |
| 5,367,627 A | 11/1994 | Johnson |
| 5,412,730 A | 5/1995 | Jones |
| 5,483,049 A | 1/1996 | Schulze, Jr. |
| 5,493,490 A | 2/1996 | Johnson |
| 5,500,802 A | 3/1996 | Morris et al. |
| 5,500,934 A | 3/1996 | Austin et al. |
| 5,615,342 A | 3/1997 | Johnson |
| 5,617,514 A | 4/1997 | Dolby et al. |

(Continued)

FOREIGN PATENT DOCUMENTS

| | | |
|---|---|---|
| GB | 2359157 | 8/2001 |
| JP | 2004259070 | 9/2004 |

(Continued)

OTHER PUBLICATIONS

PRNewswire, Apr. 28, 2004 "Revenue Management Suite for Pharmaceutical Companies", http://www.prnewswire.com/news-releases/model-n-announces-breakthrough-revenue-management-suite-for-pharmaceutical-companies-72702922,html (3 pages).

(Continued)

*Primary Examiner* — Doug Hutton, Jr.
*Assistant Examiner* — Andrew McIntosh
(74) *Attorney, Agent, or Firm* — K&L Gates LLP (57) ABSTRACT

A dynamic document generator system and method provides a web-based visual editor which includes a drag-and-drop mechanism structured to facilitate generation of a markup language version of a dynamic document including data indicative of a dynamic field. The markup language version of the dynamic document is then converted to a stylesheet version of the dynamic document. The stylesheet version of the dynamic document is deployed via a wide area network, wherein a plurality of different users are able to execute the deployed stylesheet version of the dynamic document. When one user executes the dynamic document, the dynamic field takes on one value. When another user executes the dynamic document, the dynamic filed takes on another value.

43 Claims, 9 Drawing Sheets

(56) References Cited

U.S. PATENT DOCUMENTS

| | | | |
|---|---|---|---|
| 5,623,637 | A | 4/1997 | Jones et al. |
| 5,625,776 | A | 4/1997 | Johnson |
| 5,630,025 | A | 5/1997 | Dolby et al. |
| 5,745,765 | A | 4/1998 | Paseman |
| 5,758,331 | A | 5/1998 | Johnson |
| 5,819,302 | A | 10/1998 | Nielsen |
| 5,825,651 | A | 10/1998 | Gupta et al. |
| 5,844,554 | A | 12/1998 | Geller et al. |
| 5,877,966 | A | 3/1999 | Morris et al. |
| 5,909,533 | A | 6/1999 | Kitabayashi et al. |
| 5,963,953 | A | 10/1999 | Cram et al. |
| 5,987,480 | A * | 11/1999 | Donohue et al. .............. 715/207 |
| D421,694 | S | 3/2000 | Kitabayashi et al. |
| 6,035,305 | A | 3/2000 | Strevey et al. |
| 6,049,822 | A | 4/2000 | Mittal |
| 6,061,697 | A | 5/2000 | Nakao |
| 6,067,087 | A | 5/2000 | Krauss |
| 6,067,525 | A | 5/2000 | Johnson et al. |
| D431,156 | S | 9/2000 | Lewis et al. |
| 6,119,102 | A | 9/2000 | Rush et al. |
| 6,141,658 | A | 10/2000 | Mehr et al. |
| D434,601 | S | 12/2000 | Lewis et al. |
| 6,167,383 | A | 12/2000 | Henson |
| 6,169,979 | B1 | 1/2001 | Johnson |
| 6,177,932 | B1 | 1/2001 | Galdes et al. |
| 6,178,362 | B1 | 1/2001 | Woolard et al. |
| 6,182,059 | B1 | 1/2001 | Angotti et al. |
| D438,061 | S | 2/2001 | Lewis et al. |
| D438,062 | S | 2/2001 | Lewis et al. |
| 6,199,067 | B1 | 3/2001 | Geller |
| 6,205,446 | B1 | 3/2001 | Mittal et al. |
| 6,233,564 | B1 | 5/2001 | Schulze, Jr. |
| 6,233,609 | B1 | 5/2001 | Mittal |
| 6,278,996 | B1 | 8/2001 | Richardson et al. |
| 6,289,340 | B1 | 9/2001 | Puram et al. |
| 6,311,149 | B1 | 10/2001 | Ryan et al. |
| 6,370,882 | B1 | 4/2002 | Adamski et al. |
| 6,397,219 | B2 | 5/2002 | Mills |
| 6,411,947 | B1 | 6/2002 | Rice et al. |
| 6,430,609 | B1 | 8/2002 | Dewhurst et al. |
| 6,438,547 | B1 | 8/2002 | Mehr et al. |
| 6,453,255 | B1 | 9/2002 | Smorodinsky et al. |
| 6,453,302 | B1 | 9/2002 | Johnson et al. |
| 6,460,077 | B2 | 10/2002 | Mittal |
| 6,480,859 | B2 | 11/2002 | Mittal et al. |
| 6,497,360 | B1 | 12/2002 | Schulze, Jr. |
| 6,510,352 | B1 | 1/2003 | Badavas et al. |
| 6,512,361 | B1 | 1/2003 | Becker |
| 6,535,896 | B2 | 3/2003 | Britton et al. |
| 6,535,913 | B2 | 3/2003 | Mittal et al. |
| 6,567,729 | B2 | 5/2003 | Betters et al. |
| 6,577,962 | B1 | 6/2003 | Afshari |
| 6,598,052 | B1 | 7/2003 | Saulpaugh et al. |
| 6,611,844 | B1 | 8/2003 | Saulpaugh et al. |
| 6,633,863 | B1 | 10/2003 | Sorensen Moller et al. |
| 6,636,893 | B1 | 10/2003 | Fong |
| 6,668,354 | B1 | 12/2003 | Chen et al. |
| D487,825 | S | 3/2004 | Kim et al. |
| 6,732,027 | B2 | 5/2004 | Whetsell et al. |
| 6,776,151 | B2 | 8/2004 | Wiersma et al. |
| 6,789,252 | B1 | 9/2004 | Burke et al. |
| 6,799,299 | B1 | 9/2004 | Li et al. |
| 6,813,531 | B2 | 11/2004 | Coale et al. |
| 6,826,572 | B2 | 11/2004 | Colace |
| 6,836,766 | B1 | 12/2004 | Gilpin et al. |
| 6,859,699 | B2 | 2/2005 | Carroll et al. |
| 6,901,595 | B2 | 5/2005 | Mukundan et al. |
| 6,915,253 | B1 | 7/2005 | Chapman |
| 6,917,304 | B1 | 7/2005 | Jones et al. |
| 6,941,305 | B2 | 9/2005 | Magouirk et al. |
| 6,959,236 | B2 | 10/2005 | Betters et al. |
| 6,981,212 | B1 | 12/2005 | Claussen et al. |
| 6,981,222 | B2 | 12/2005 | Rush et al. |
| 6,983,187 | B2 | 1/2006 | Kern |
| 6,996,776 | B1 | 2/2006 | Makely et al. |
| 6,996,781 | B1 | 2/2006 | Myers et al. |
| 7,003,360 | B1 | 2/2006 | Dillon |
| 7,039,602 | B1 | 5/2006 | Kapadia et al. |
| 7,039,859 | B1 | 5/2006 | Sundaresan |
| 7,043,320 | B1 | 5/2006 | Roumeliotis et al. |
| 7,062,478 | B1 | 6/2006 | Huelsman et al. |
| 7,080,083 | B2 | 7/2006 | Kim et al. |
| 7,084,735 | B2 | 8/2006 | Kapolka |
| 7,086,002 | B2 | 8/2006 | Elo et al. |
| 7,089,127 | B2 | 8/2006 | Thibedeau et al. |
| 7,117,436 | B1 | 10/2006 | O'Rourke et al. |
| 7,127,313 | B2 | 10/2006 | Neri |
| 7,127,705 | B2 | 10/2006 | Christfort et al. |
| 7,143,344 | B2 * | 11/2006 | Parker et al. .................. 715/236 |
| 7,155,667 | B1 | 12/2006 | Kotler et al. |
| 7,165,041 | B1 | 1/2007 | Guheen et al. |
| 7,167,876 | B2 | 1/2007 | Cookson et al. |
| 7,188,075 | B1 | 3/2007 | Smirnov |
| 7,188,335 | B1 | 3/2007 | Darr et al. |
| 7,188,527 | B2 | 3/2007 | Jones et al. |
| 7,191,394 | B1 | 3/2007 | Ardeleanu et al. |
| 7,225,038 | B2 | 5/2007 | Kind |
| 7,225,818 | B2 | 6/2007 | Kim et al. |
| 7,277,925 | B2 | 10/2007 | Warnock |
| 7,293,237 | B1 | 11/2007 | Knight et al. |
| 7,308,646 | B1 | 12/2007 | Cohen et al. |
| 7,343,584 | B1 | 3/2008 | Plain et al. |
| 7,353,192 | B1 | 4/2008 | Ellis et al. |
| 7,359,777 | B2 | 4/2008 | Betters et al. |
| 7,360,071 | B2 | 4/2008 | Ewing et al. |
| 7,380,204 | B2 | 5/2008 | Lomelin-Stoupignan et al. |
| 7,386,832 | B2 | 6/2008 | Brunner et al. |
| 7,389,471 | B2 | 6/2008 | Croney et al. |
| 7,398,233 | B1 | 7/2008 | Bayer et al. |
| 7,406,359 | B2 | 7/2008 | Roumeliotis et al. |
| 7,415,010 | B1 | 8/2008 | Croak et al. |
| 7,415,482 | B2 | 8/2008 | Blake et al. |
| 7,437,432 | B2 | 10/2008 | Bodin et al. |
| 7,457,789 | B2 | 11/2008 | Axling |
| 7,467,122 | B2 | 12/2008 | Morita et al. |
| 7,505,921 | B1 | 3/2009 | Lukas et al. |
| 7,516,088 | B2 | 4/2009 | Johnson et al. |
| 7,519,549 | B1 | 4/2009 | Johnson et al. |
| 7,580,871 | B2 | 8/2009 | Brunner et al. |
| 7,590,944 | B2 | 9/2009 | Weber et al. |
| 7,606,739 | B1 | 10/2009 | Johnson |
| 7,627,745 | B2 | 12/2009 | Martinez et al. |
| 7,650,296 | B1 | 1/2010 | Brunner et al. |
| 7,657,386 | B2 | 2/2010 | Thibedeau et al. |
| 7,685,507 | B2 | 3/2010 | Workman et al. |
| 7,689,904 | B2 | 3/2010 | Ritter |
| 7,703,092 | B1 | 4/2010 | Glaser et al. |
| 7,788,591 | B2 | 8/2010 | Brunner et al. |
| 7,818,082 | B2 | 10/2010 | Roumeliotis et al. |
| 7,822,632 | B2 | 10/2010 | Bayer et al. |
| 7,844,495 | B2 | 11/2010 | Verchere |
| 7,941,341 | B2 | 5/2011 | Johnson et al. |
| 7,949,578 | B2 | 5/2011 | Johnson et al. |
| 8,121,904 | B2 | 2/2012 | Johnson |
| 8,131,487 | B2 | 3/2012 | Thibedeau et al. |
| 8,166,385 | B2 | 4/2012 | Garcia-Molina et al. |
| 8,245,020 | B1 | 8/2012 | Gupta |
| 8,266,015 | B2 | 9/2012 | Johnson et al. |
| 8,271,355 | B2 | 9/2012 | Johnson et al. |
| 8,341,011 | B2 | 12/2012 | Veit |
| 2001/0056460 | A1 | 12/2001 | Sahota et al. |
| 2002/0010598 | A1 | 1/2002 | Johnson et al. |
| 2002/0026447 | A1 | 2/2002 | Matsutsuka et al. |
| 2002/0035463 | A1 | 3/2002 | Lynch et al. |
| 2002/0042749 | A1 | 4/2002 | Yugami et al. |
| 2002/0078435 | A1 | 6/2002 | Liu et al. |
| 2002/0087432 | A1 | 7/2002 | Muniz |
| 2002/0121095 | A1 | 9/2002 | Adamski et al. |
| 2002/0123878 | A1 | 9/2002 | Menke |
| 2003/0028449 | A1 | 2/2003 | Heinen et al. |
| 2003/0033377 | A1 * | 2/2003 | Chatterjee et al. ............ 709/218 |
| 2003/0172343 | A1 | 9/2003 | Leymaster et al. |
| 2004/0010496 | A1 | 1/2004 | Behrendt et al. |
| 2004/0249664 | A1 | 12/2004 | Broverman et al. |

(56) References Cited

U.S. PATENT DOCUMENTS

| | | | |
|---|---|---|---|
| 2004/0255233 A1 | 12/2004 | Croney et al. | |
| 2005/0055633 A1* | 3/2005 | Ali et al. | 715/513 |
| 2005/0102612 A1 | 5/2005 | Allan et al. | |
| 2005/0108633 A1 | 5/2005 | Sahota et al. | |
| 2005/0138078 A1 | 6/2005 | Christenson et al. | |
| 2005/0144087 A1 | 6/2005 | Huang et al. | |
| 2005/0160359 A1* | 7/2005 | Falk et al. | 715/513 |
| 2005/0204281 A1* | 9/2005 | Choate | 715/513 |
| 2005/0240451 A1 | 10/2005 | Johnson et al. | |
| 2006/0129929 A1 | 6/2006 | Weber et al. | |
| 2006/0155654 A1 | 7/2006 | Plessis et al. | |
| 2006/0166642 A1 | 7/2006 | Puthenpura et al. | |
| 2006/0168540 A1 | 7/2006 | Cejka et al. | |
| 2006/0178973 A1* | 8/2006 | Chiovari et al. | 705/35 |
| 2006/0294459 A1 | 12/2006 | David et al. | |
| 2007/0074106 A1* | 3/2007 | Ardeleanu et al. | 715/513 |
| 2007/0074127 A1 | 3/2007 | Acker et al. | |
| 2007/0083533 A1 | 4/2007 | Mirkazemi et al. | |
| 2007/0203771 A1 | 8/2007 | Caballero et al. | |
| 2007/0226066 A1 | 9/2007 | Brunner et al. | |
| 2007/0294100 A1 | 12/2007 | Chen et al. | |
| 2008/0005287 A1 | 1/2008 | Harvey et al. | |
| 2008/0066052 A1 | 3/2008 | Wolfram | |
| 2008/0086682 A1* | 4/2008 | Derricott et al. | 715/239 |
| 2008/0208606 A1 | 8/2008 | Allsop et al. | |
| 2009/0012854 A1 | 1/2009 | Altice et al. | |
| 2009/0050186 A1 | 2/2009 | Kim et al. | |
| 2009/0089174 A1 | 4/2009 | Brunner et al. | |
| 2010/0036747 A1 | 2/2010 | Bagley et al. | |
| 2010/0037142 A1 | 2/2010 | Bagley et al. | |
| 2010/0037159 A1 | 2/2010 | Bagley et al. | |
| 2010/0037162 A1 | 2/2010 | Bagley et al. | |
| 2010/0131872 A1 | 5/2010 | Bagley et al. | |
| 2010/0161385 A1 | 6/2010 | Karypis et al. | |
| 2010/0223215 A1 | 9/2010 | Karypis | |
| 2010/0293042 A1 | 11/2010 | McManus et al. | |
| 2010/0318412 A1 | 12/2010 | Karypis et al. | |
| 2011/0208618 A1 | 8/2011 | Christenson et al. | |
| 2011/0246322 A1 | 10/2011 | Wulteputte et al. | |
| 2011/0264486 A1 | 10/2011 | Johnson et al. | |
| 2011/0301984 A1 | 12/2011 | Johnson et al. | |
| 2011/0307294 A1 | 12/2011 | Barkai et al. | |
| 2012/0042242 A1 | 2/2012 | Garland et al. | |
| 2012/0123898 A1 | 5/2012 | Kirkeby et al. | |
| 2012/0143721 A1 | 6/2012 | Hutchinson et al. | |
| 2012/0221429 A1 | 8/2012 | Verchere | |
| 2012/0232979 A1 | 9/2012 | Bous | |
| 2012/0271730 A1 | 10/2012 | McNall et al. | |

FOREIGN PATENT DOCUMENTS

| | | |
|---|---|---|
| WO | 0150349 | 7/2001 |
| WO | 0190873 | 11/2001 |
| WO | WO 2004/075466 | 9/2004 |
| WO | WO2007127857 | 11/2007 |

OTHER PUBLICATIONS

Krell Software, Inc., 2005, "Data Auditing for Sarbanes-Oxley (SOX) Compliance", krell-software.com/omniaudit/data_auditing_for_sarbanes_oxley_printable.asp (3 pages).

International Search Report and Written Opinion of the International Searching Authority for International Application No. PCT/US10/33217 dated Jan. 27, 2011 (7 pages).

* cited by examiner

```
1   <?xml version="1.0" encoding="UTF-8" ?>
2   <!-- edited with XMLSPY v2004 rel. 2 U (http://www.xmlspy.com) by Colleen Bajohr (BigMachines)
2   <xsl:stylesheet version="1.0" xmlns:xsl="http://www.w3.org/1999/XSL/Transform" xmlns:fo="http://
4       <xsl:decimal-format name="american" decimal-separator="." grouping-separator=","/>
5       <xsl:strip-space elements="*"/>
6       <!-- main_doc contains all main document attributes from the quote -->
7       <xsl:variable name="main_doc" select="/transaction/data_xml/document[@data_type=0] "/>
8
9   <xsl:variable name="samplerXHTML"><![CDATA[
10  <h1> This is Heading 1 </h1><p><span class="note">This sample is made based on the <a href="
11
12
13  <p>This is a paragraph. It's just something I threw together. This sentence contains <a href="ht
14
15  <h2> I'm Heading 2 </h2>
16
17  <p>  This is a paragraph. It's just something I threw together. In the beginning was
18
19
20  <h3>Heading 3 here </h3>
21
22  <p>This is a paragraph. It's just something I threw together. In the beginning was the word. And
23
24  <h4>Heading 4: thefinal insult </h4>
25
26  <p>This is a paragraph. It's just something I threw together. In the beginning was the word. And
27
28  <h5>Heading 5 I Am said Sam. In the Mosaic browser default stylesheet, I'm one stop smaller than
29  </h5>
30
31  <p>       This is a paragraph. It's just something I threw together. In the beginning was
32
33
34  <h6>Heading 6, extended to produce a line break, so as to be able to determine line-height. This
35  </h6>
36
37  <p>This sentence contains <em>This sentence contains </em>. This sentence contains <strong> st:
38
39  <p><big>This is big.</big>
40  <small>This is small.</small>
41  <samp>This is SAMP.</samp>
42  <samp>This is SAMP.</samp>
```

METHODS AND APPARATUS FOR GENERATING A DYNAMIC DOCUMENT

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Businesses use a variety of documents such as proposals, contracts, and order forms in relation to their business which typically include information relating to their business such as a business logo, a business address and/or a price of a product. The information included in each document typically depends on a variety of factors. For example, a business may offer different prices for different customers, or use different warranties for different products. Often, employees may have to cross out information by hand in a document that does not apply to a specific document, or write in additional information by hand that applies to the specific document.

Through the use of technology, businesses can now model their documents programmatically. For example, a programmer may create an electronic file with a predesigned, customized format and structure, as for a fax, letter, or expense report, which may be filled in by another. However, the programming of certain documents typically requires a document designer to have a technical understanding of the underlying code associated with the document or to rely on a technical specialist. Certain documents created for computer systems can be time consuming and difficult for the document designer, who may not have the technical expertise.

SUMMARY

The present disclosure provides a new and innovative method, system and apparatus for generating a dynamic document. Specifically, the disclosed system provides a web-based visual editor to facilitate generation of a markup language version of the dynamic document. In one example, the web-based visual editor includes a drag-and-drop mechanism. In one example, the markup language version of the dynamic document includes a template for the dynamic document. A user may generate the markup version of the dynamic document by adding various elements such as dynamic fields to the dynamic document.

After the user generates the markup version of the dynamic documents, the markup language version of the dynamic document is converted to a stylesheet version of the dynamic document. The stylesheet version of the dynamic documents is deployed which enables a plurality of users to execute the stylesheet version of the dynamic document.

When the stylesheet version of the dynamic document is executed by a first user, the dynamic field is associated with a first instance of field data (e.g., one sales price for an item). When the stylesheet version of the dynamic document is executed by a second different user, the dynamic field is associated with a second different instance of field data (e.g., a different price for the same item).

The disclosed system thus enables a user to create dynamic documents in an intuitive manner without needing to have technical knowledge of the underlying systems and without the need for a technical specialist. Additional features and advantages are described herein, and will be apparent from the following Detailed Description and the figures.

BRIEF DESCRIPTION OF THE FIGURES

FIG. 6 is a screen shot showing XSL stylesheet code for a dynamic document.

DETAILED DESCRIPTION OF EXEMPLARY EMBODIMENTS

Figure 1:
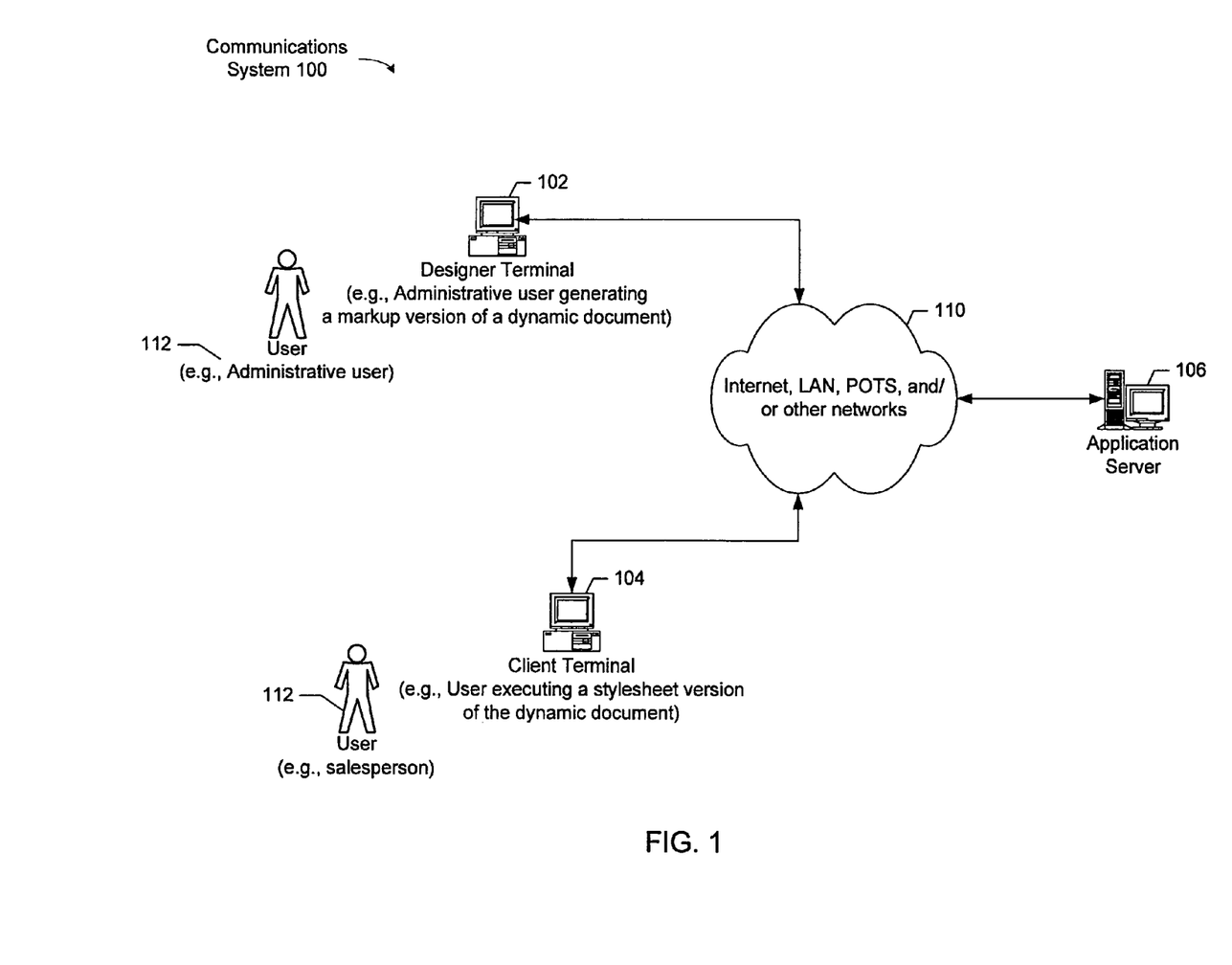
FIG. 1 is a high level block diagram of an example communications system.

The present system is most readily realized in a network communications system. A high level block diagram of an exemplary network communications system 100 is illustrated in FIG. 1. The illustrated system 100 includes one or more designer terminals 102, one or more client terminals 104 and one or more application servers 106. Each of these devices may communicate with each other via a connection to one or more networks 110 such as the Internet and/or some other data network, including, but not limited to, any suitable wide area network or local area network. It will be appreciated that any of the devices described herein may be directly connected to each other instead of over a network.

One application server 106 may interact with a large number of other devices. Accordingly, each application server 106 is typically a high end computer with a large storage capacity, one or more fast microprocessors, and one or more high speed network connections. Conversely, relative to a typical application server 106, each designer terminal 102 and/or client terminal 104 typically includes less storage capacity, a single microprocessor, and a single network connection.

Figure 2:
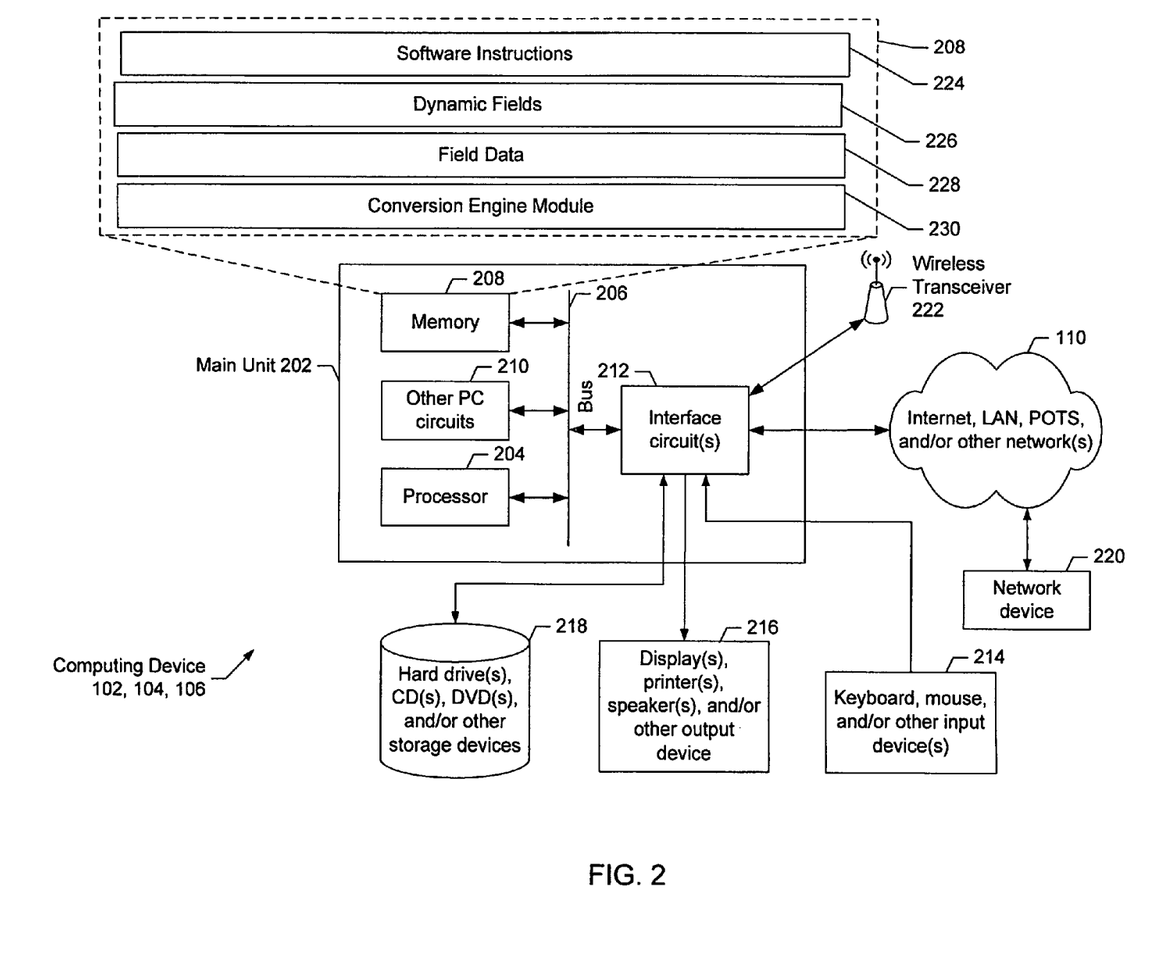
FIG. 2 is a more detailed block diagram showing one example of a computing device.

A detailed block diagram of an example computing device 102, 104, 106 is illustrated in FIG. 2. Each computing device 102, 104, 106 may include a server, a personal computer (PC), a personal digital assistant (PDA), and/or any other suitable computing device. Each computing device 102, 104, 106 preferably includes a main unit 202 which preferably includes one or more processors 204 electrically coupled by an address/data bus 206 to one or more memory devices 208, other computer circuitry 210, and one or more interface circuits 212. The processor 204 may be any suitable processor.

The memory 208 preferably includes volatile memory and non-volatile memory. Preferably, the memory 208 and/or another storage device 218 stores software instructions 224 that interact with the other devices in the system 100 as described herein. These software instructions 224 may be executed by the processor 204 in any suitable manner. The memory 208 and/or another storage device 218 may also store digital data indicative of documents, files, programs, web pages, etc. retrieved from another computing device 102, 104, 106 and/or loaded via an input device 214.

In one example, the memory device 208 stores software instructions 224, dynamic fields 226, field data 228 and a conversion engine module 230 for use by the system as described in detail below. It should be appreciated that any type of suitable data structure (e.g., a flat file data structure, a relational database, a tree data structure, etc.) may be used to facilitate implementation of the methods and apparatus disclosed herein.

The dynamic fields 228 preferably describe the data found in a field. For example, the dynamic fields 228 may include Extensible Markup Language (XML) schema elements which define field data 228 which may appear in the dynamic document. An XML schema element may include a dynamic field Bike Model Names which defines field data including, for example, Touring Bike 1000S, Touring Bike 500D and Touring Bike X899. The field data 228 is preferably subject to change on a frequent basis. For example, field data 228 may include data relating to the current price of an item or the current amount of an item in inventory which are subject to change on a frequent basis.

The conversion engine module 230 converts a markup language version of the dynamic document to a stylesheet version of the dynamic document. A markup language is a set of codes or tags that give instructions as to the structure and/or format of how text is displayed. Four well known markup languages include Standard Generalized Markup Language (SGML), Hyper Text Markup Language (HTML), Extensible Markup Language (XML), and Wireless Markup Language (WML). A stylesheet describes how a source document, such as an XML document, is transformed into an output document. For example, an XSL stylesheet includes transformation rules which may defined structural transformation rules and/or formatting transformation rules. An XSL stylesheet is commonly understood in the art to include different types of transformation languages including XSL Transformations (XSLT), XPath, and XSL Formatting Objects. It is intended that this broader aspect of the term XSL shall apply herein.

The interface circuit(s) 212 may be implemented using any suitable interface standard, such as an Ethernet interface and/or a Universal Serial Bus (USB) interface. One or more input devices 214 may be connected to the interface circuit(s) 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit(s) 212. The display 216 may be a cathode ray tube (CRTs), liquid crystal displays (LCDs), or any other type of display. The display 216 generates visual displays of data generated during operation of the computing device 102, 104, 106. For example, the display 216 may be used to display web pages received from the application server 106. The visual displays may include prompts for human input, run time statistics, calculated values, data, etc.

One or more storage devices 218 may also be connected to the main unit 202 via the interface circuit(s) 212. For example, a hard drive, CD drive, DVD drive, and/or other storage devices may be connected to the main unit 202. The storage devices 218 may store any type of data used by the computing device 102, 104, 106.

Each computing device 102, 104, 106 may also exchange data with other network devices 220 via a connection to the network 110. The network connection may be any type of network connection, such as an Ethernet connection, digital subscriber line (DSL), telephone line, coaxial cable, etc. Users 112 of the system 100 may be required to register with the application server 106. In such an instance, each user 112 may choose a user identifier (e.g., e-mail address) and a password which may be required for the activation of services. The user identifier and password may be passed across the network 110 using encryption built into the user's browser, or computing device 102, 104, 106. Alternatively, the user identifier and/or password may be assigned by the application server 106.

Figure 3:
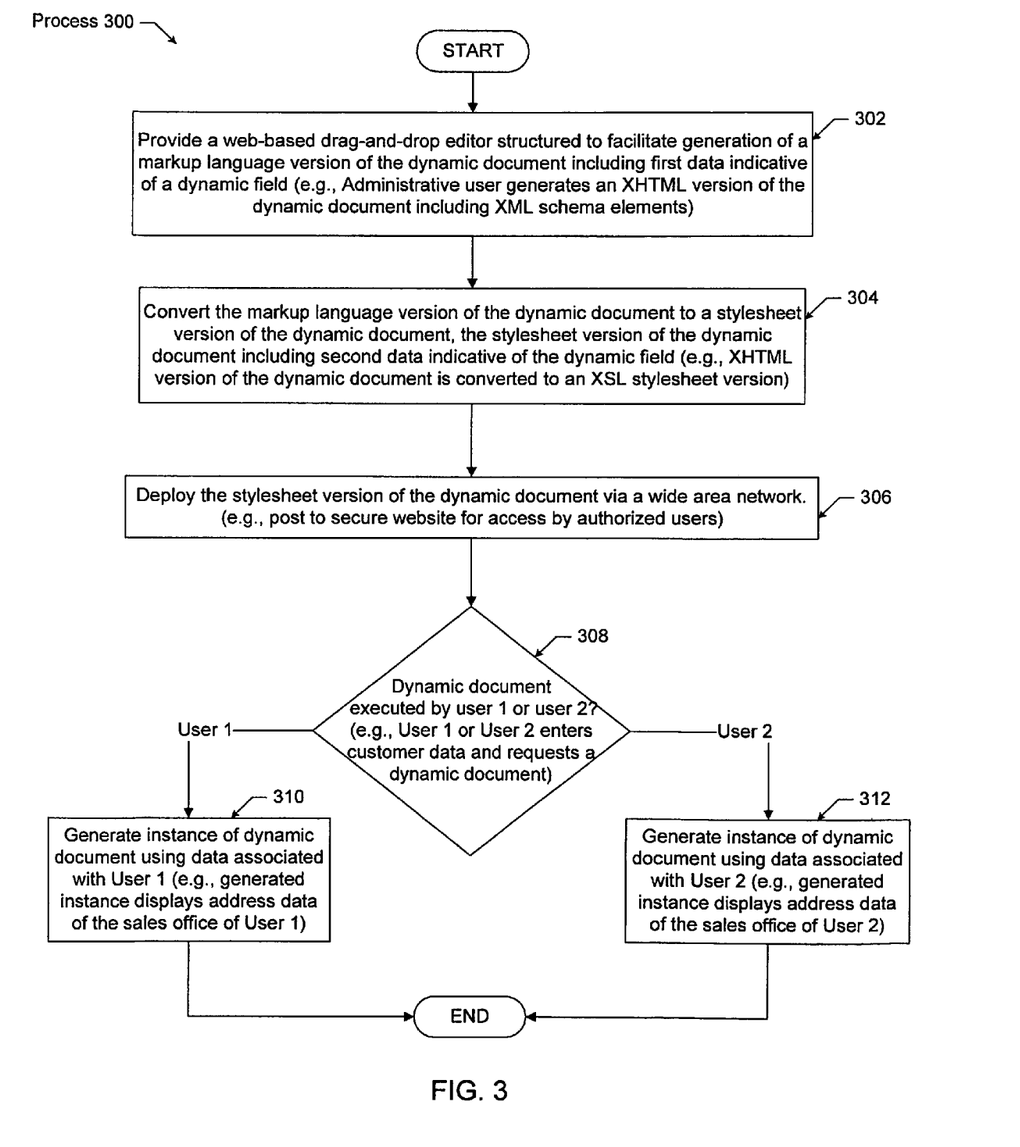
FIG. 3 is a flowchart showing one example of a process for generating a dynamic document.

A flowchart of an example process 300 for generating a dynamic document is presented in FIG. 3. Preferably, the process 300 is embodied in one or more software programs which are stored in one or more memories and executed by one or more processors. Although the process 300 is described with reference to the flowchart illustrated in FIG. 3, it will be appreciated that many other methods of performing the acts associated with process 300 may be used. For example, the order of many of the steps may be changed, some of the steps described may be optional, and additional steps may be included.

In general, an administrative user 112 preferably causes the design terminal to generate a markup language version (i.e., a template version) of a dynamic document having dynamic fields using a web-based visual which includes a drag-and-drop mechanism. The application server 106 preferably converts the markup language version of the dynamic document to a stylesheet version of the dynamic document. The application server 106 deploys the stylesheet version of the dynamic document via a wide area network to allow users to execute the stylesheet version of the dynamic document.

More specifically, a designer terminal 102 preferably provides a web-based visual editor which includes a drag-and-drop mechanism structured to facilitate generation of a markup language version of the dynamic document including first data indicative of a dynamic field (block 302). As described above the dynamic fields 228 define field data 226 which may appear in the dynamic document. In one example, the markup language version of the dynamic document includes an XHTML version. In one example, the web-based visual editor may display a user selectable template to assist the user 112 in the design of the dynamic document. The template may be associated with dynamic documents such as proposals, contracts or an order forms.

In one example, the designer terminal 102 preferably stores the markup version of the dynamic document before converting the markup version of the dynamic document. That is, the user 112 which causes the design terminal 102 to generate the markup version of the dynamic document may decide when to deploy and convert the markup version of the dynamic document to a stylesheet version of the dynamic document. It should be appreciated that the markup version of the dynamic document may be stored in any of the computing devices 102, 104, 106.

Next, the application server 106 preferably converts the markup language version of the dynamic document to a stylesheet version of the dynamic document. The stylesheet version of the dynamic document preferably includes second data indicative of the dynamic field (block 304). In one example, where the markup language of the dynamic document is in XHTML, the conversion engine 230 converts the XHTML to an XSL stylesheet when the user 112 selects a deploy button provided by the web-based visual editor. In this example, the application server 106 includes coded algorithms which are used to convert the XHTML to XSL. More specifically, in this example, the coded algorithm is an XSL file which includes conversion templates that convert the XHTML to XSL Formatting Objects (XSL:FO). Such conversion may include formatting styles, tables, margins, and page layouts of the dynamic document. This content then undergoes an additional transformation where the XSL elements (i.e., the loops and the logic) are inserted based on custom XHTML tags.

The application server 106 preferably deploys the stylesheet version of the dynamic document via a wide area network (block 306). In one example, the application server 106 posts the stylesheet version to a secure website for access by authorized users when the dynamic document is deployed. In one example, the stylesheet version of the dynamic document is deployed when the user 112 selects a deploy button provided by the web-based visual editor. In one example, the application server 106 preferably stores the stylesheet version of the dynamic document. It should be appreciated that the markup version of the dynamic document may be stored in any of the computing devices 102, 104, 106. The deployment process runs the conversion of XHTML to XSL/XSL:FO. The conversion process preferably occurs at the application server 106.

After the stylesheet version of the dynamic document is deployed, the application server 106 preferably enables a plurality of different authorized users to execute the stylesheet version of the dynamic documents. When the stylesheet version of the dynamic document is executed by a user 112, the application server 106 preferably determines which of a plurality of users executed the dynamic document. In the illustrated example of FIG. 3 the application server 106 preferably determines whether the dynamic document has been executed by User 1 or User 2 (decision diamond 308).

If the application server 106 determines User 1 executed the dynamic document, the application server 106 preferably generates an instance of the dynamic document using data associated with User 1 (block 310). If the application server 106 determines User 1 executed the dynamic document, the application server 106 preferably generates an instance of the dynamic document using data associated with User 1 (block 312).

The data associated with User 1 or User 2 can be any suitable data. In one example, User 1 is salesperson who has an office address and User 2 is a different salesperson with a different office address. In this example, the data associated with the salespersons may be the respective addresses of the sales office. Accordingly, in this example, when User 1 executes the dynamic document, the application server 106 generates an instance of the dynamic document using the address of the sales office associated with User 1. When User 2 executes the dynamic document, the application server 106 generates an instance of the dynamic document using the address of the sales office associated with User 2. In one example, when the stylesheet version of the dynamic documents is executed, the client device 104 displays the dynamic documents in PDF or RTF form.

In one example embodiment, the data associated with User 1 or User 2 includes data entered by a user 112 through the client terminal 104. When a user 112 executes the dynamic document, the application server 106 generates an instance of the dynamic document using the data the user 112 entered though the client terminal 104. That is, in this example, the application server 106 does not determine whether the dynamic document is executed by user 1 or user 2, because the generated instance of the dynamic document does not depend on which user executed the dynamic document. The data entered by the user may be different for the same user each time the user executes the dynamic document. In one example wherein a user 112 is a salesperson, at a first moment in time the salesperson enters data associated with a customer order into a client terminal 104. For example, the salesperson may request an order of two bicycle models for a customer. The user 112 then executes the stylesheet version of the dynamic document and a PDF version of the dynamic document is displayed at the client terminal 104. In this example (not shown), the displayed dynamic document includes, among other information, the quantity of bicycles which the salesperson's company has available in the company's inventory. If the same salesperson enters data into the client terminal 104 for a second different order of a quantity of the same bicycle model for a different client, the displayed dynamic document may include, for example, an adjusted or different quantity of bicycles which the salesperson's company has available in the company's inventory. That is, because of the salesperson's first order, the quantity of bicycles remaining in the companies inventory is adjusted to reflect a lesser amount because of the first order.

Figure 4:
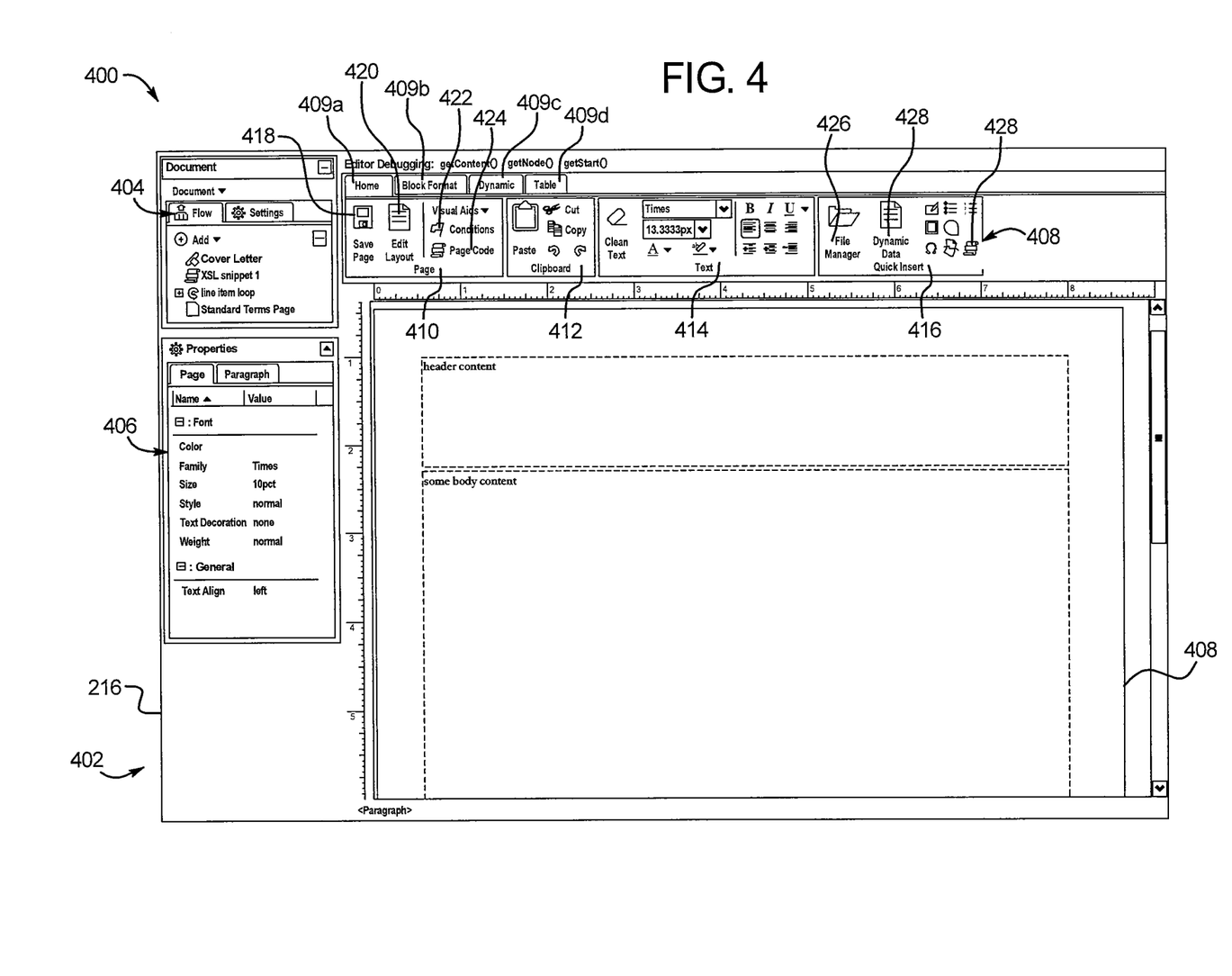
FIG. 4 is a screen shot showing an example of a web-based visual editor having a plurality of buttons associated with corresponding functions.

Referring to FIGS. 4 to 9, these example screen shots generally show a web-based visual editor 402 including a drag-and-drop mechanism structured to facilitate generation of a markup language version of the dynamic document including first data indicative of a dynamic field. As illustrated in FIG. 4, an example screen shot 400 of a web-based visual editor 402 is displayed by a designer terminal 102. The designer terminal 102 includes a display device 216 which displays a plurality of panels of information associated with the web-based drag-and-drop editor.

The web-based drag-and-drop editor 402 includes a flow tree panel 404 that illustrates the dynamic document structure and order. The dynamic document structure includes a plurality of objects that a user 112 can add, delete, edit and/or copy. For example, the objects may include a page, a loop and/or XSL snippets. A page in the document flow tree represents a page in the dynamic document. A page may include body content, margins, a header, a footer, a leftbar, and a rightbar. The page includes flowing content, so if content in the page overflows to the next page when printed by the user 112, the page becomes two pages or however many pages it flows onto. The pages may represent a complete page sequence which behaves similar to an <fo:page-sequence>. Loops, as defined in the document flow tree, may contain pages. For each iteration of the loop, the pages that are contained within the loop will be printed out. Preferably, the administrative user 112 defines the conditions for what is looped over. The conditions for what is looped over is dependent off of the XML data structure. The loops may be inserted outside of <fo:page-sequence>. The XSL snippets represent custom XSL stylesheet code which may be inserted between pages. The XSL snippets may be added or saved to the any one of the computing devices 102, 104, 106.

The web-based visual editor 402 preferably includes a page properties panel 406. The page properties panel 406 provides an interface that enables the user 112 to format dynamic document properties such as color, font family, font size, and text decoration for a current dynamic document page 408 of the dynamic document. In this example, such format properties are applied to all of the regions of the dynamic document page 408 as defaults only.

The web-based visual editor 402 may also include a page design toolbar 408 that includes a plurality of tabs 409. The web-based visual editor 402 may include tabs such as a Home tab 409a, a Block Format tab 409b, a Dynamic tab 409c, and a Table tab 410d. Each tab 409 preferably includes a plurality of groups having a plurality of buttons wherein each button corresponds to a function described in more detail below.

In this example, the Home tab 409a includes groups such as the Page group 410, the Clipboard group 412, the Text group 414 and the Quick Insert group 416. Each of these groups have a plurality of buttons that enables the user 112 to apply the corresponding functions to the dynamic document page 408.

The Page group 410 includes a plurality of buttons including, among others, a Save Page button 418, an Edit Page button 420, a Conditions button 422, and a Page Code button 424. In this example, when the user 112 selects the Save Page button 418, the current dynamic document page 408 is stored in the design terminal 102 as an XHTML version of the dynamic document.

Figure 5:
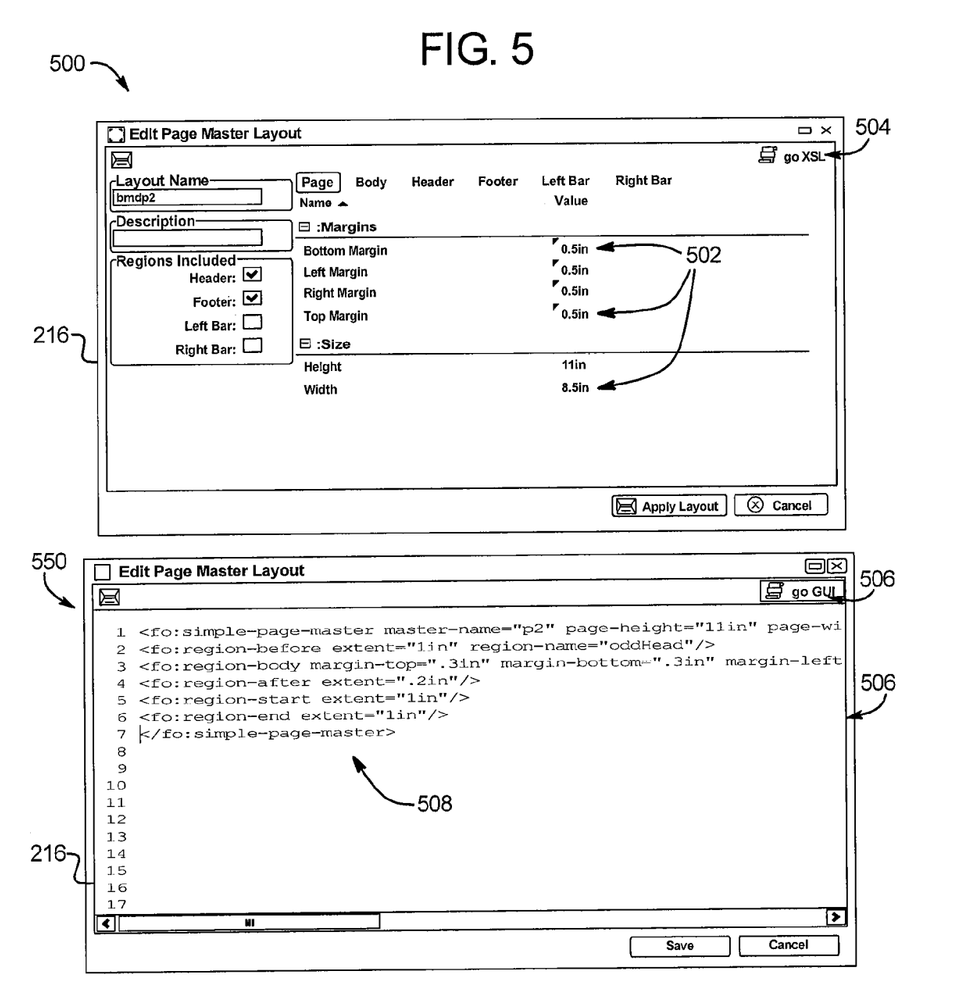
FIG. 5 is a first and second screen shot showing an example of an edit page master layout panel.

When the user 112 selects the Edit Layout button 420, the web-based visual editor 402 displays an edit page master layout window as shown in screen shot 500 illustrated in FIG. 5. The page master layout window displays a plurality of page layout values 502 associated with the dynamic document page 408. The user 112 may modify the page layout values 502 by specifying different values into the user interface shown in screen shot 500. For example, the user 112 may specify a value of 0.5 inches for the bottom margin.

The edit page master layout window includes a go XSL button 504 as shown in screen shot 500. If the user 112 selects the go XSL button 504, the web-based visual editor 402 displays an XSL stylesheet code panel including XSL stylesheet code 508 as illustrated in screen shot 550. When the XSL view is displayed, the user 112 may modify the page layout of the dynamic document page 408 by directly editing the XSL stylesheet code 508 in the XSL stylesheet code panel 506. If the user 112 selects the go GUI button 506, the web-based visual editor 402 preferably displays the master layout window as illustrated by screen shot 500.

Referring back to FIG. 4, if the user 112 selects the Conditions button 422, the web-based visual editor 402 preferably displays an Expression Editor (not shown). In this example, the Expression Editor enables the user 112 to specify page conditions relating the current dynamic document page 408. In this example, if the user specified page condition is satisfied, the client terminal 104 preferably displays the current page when the user(s) 112 subsequently generate an instance of the dynamic document.

When the user 112 selects the Page Code button 424, the web-based visual editor 402 preferably generates and displays XSL stylesheet code associated with the dynamic document page 408. An example screen shot 600 of generated XSL stylesheet code associated with the dynamic document page 408 is illustrated in FIG. 6. When the generated XSL stylesheet code 602 is displayed, the user 112 may modify the data associated with the dynamic document page 408 by directly editing the XSL stylesheet code 602 associated with that dynamic document page 408.

Figure 7:
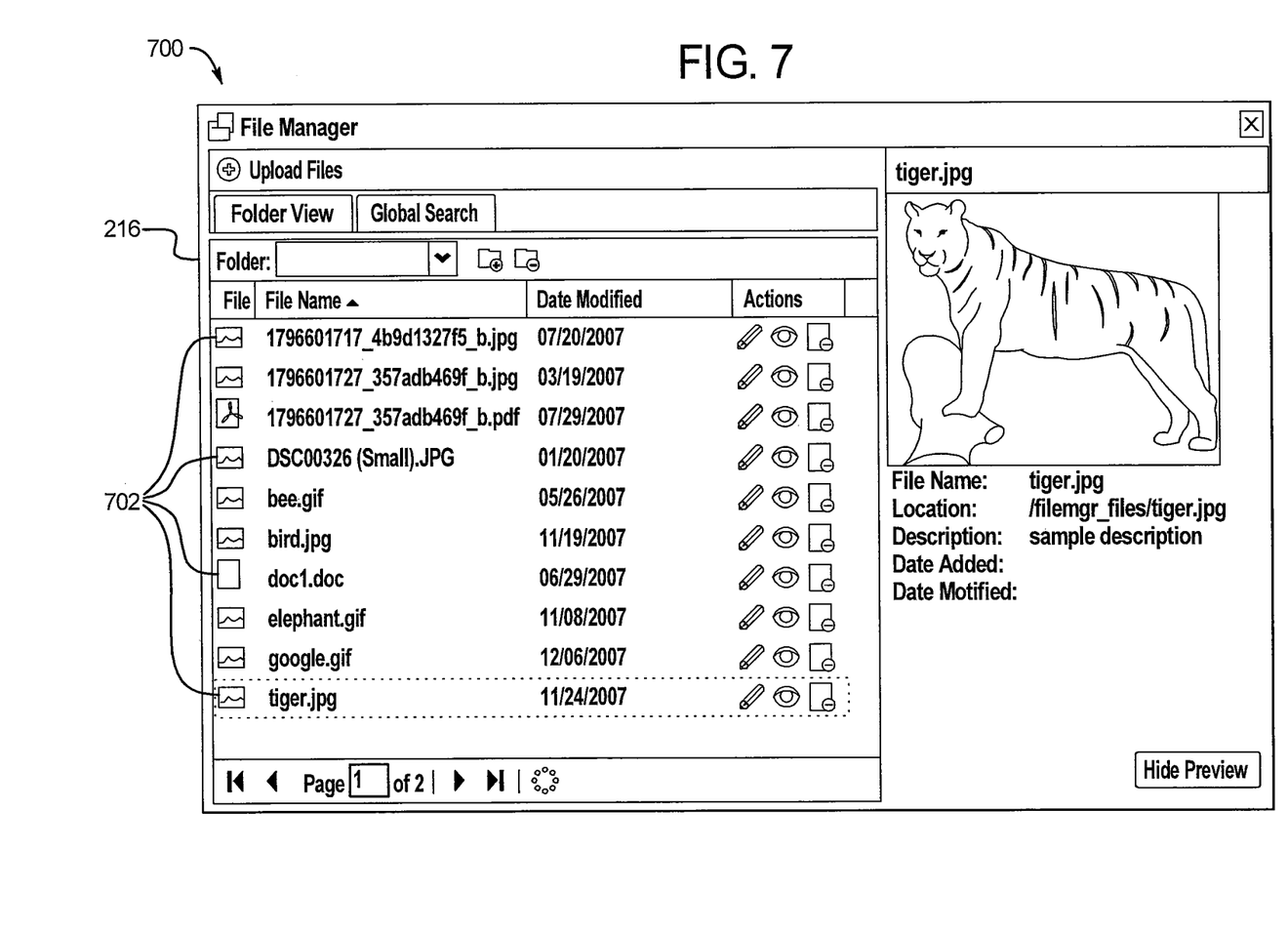
FIG. 7 is a screen shot showing an example of a file manager panel.

Referring back to FIG. 4, the Quick Insert group 416 has a plurality of buttons including, among others, a File Manager button 426, a Dynamic Data button 428, and a Insert XSL Snippet button 430. In this example, when the user 112 selects the File Manager button 426, the web-based visual editor 402 preferably displays a file manager window and enables the user 112 to insert images/files into the dynamic document page 408 to create images and hyperlinks in the dynamic document page 408. An example screen shot 700 of the file manager window is illustrated in FIG. 7. In this example, the user 112 may select and drag a file 702 and drop the selected file onto the dynamic document page 408.

Figure 8:
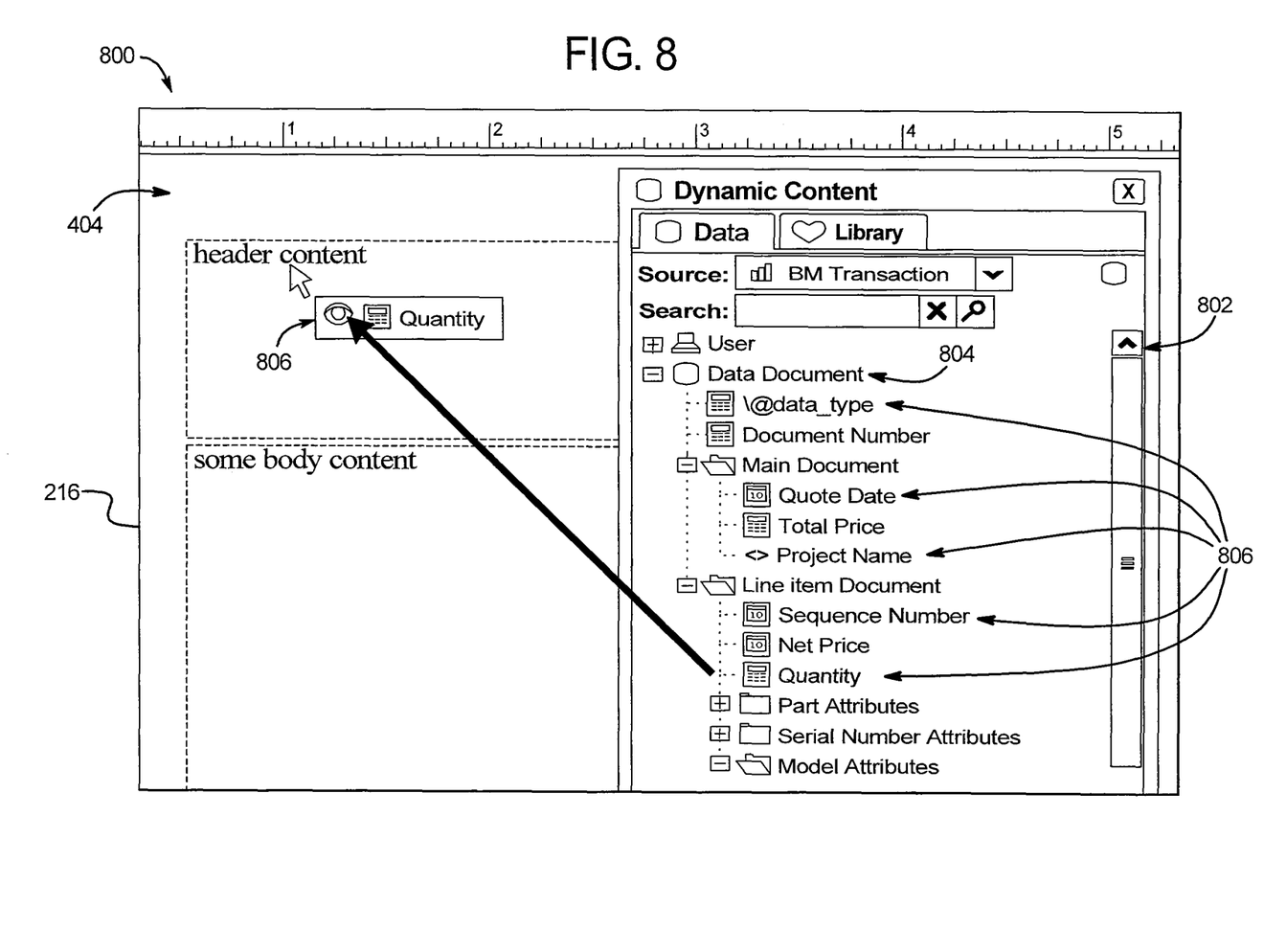
FIG. 8 is a screen shot showing an example of a dynamic data floating dialog window.

Referring back to FIG. 4, when the user 112 selects the Dynamic Data button 428, the web-based visual editor 402 preferably displays a floating dialog window that displays any XML data files used in the current dynamic document. An example screen shot 800 of the floating dialog window 802 is illustrated in FIG. 8. The floating dialog window 802 includes an XML data file 804 which includes a plurality of dynamic fields or XML schema elements 806. The user 112 may select and drag any of the XML schema elements 806 into the dynamic document page 408. As shown in the example of FIG. 8, the user 112 selects and drags the XML schema element labeled Quantity into dynamic document page 408.

Referring back to FIG. 4, when the user 112 selects the Insert XSL Snippet button 430, the web-based visual editor 402 preferably inserts an XSL icon into a user 112 selected location on the current dynamic document page 408. In this example, when the user 112 selects the inserted XSL icon, the web-based visual editor 402 preferably displays a modal XSL editor window which displays XSL stylesheet code associated with the XSL snippet. In this window, the user 112 may directly edit the displayed XSL stylesheet code associated with XSL snippet.

Figure 9:
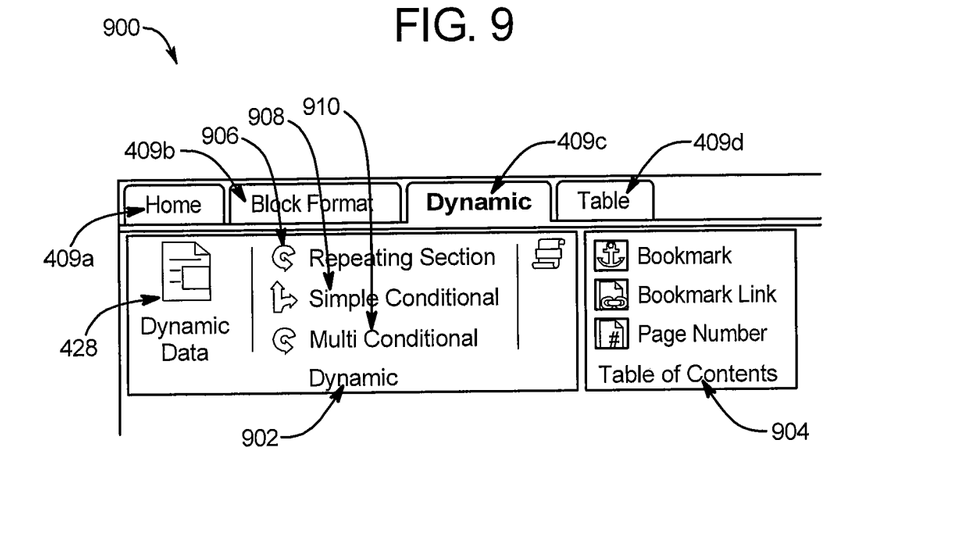
FIG. 9 is a screen shot showing an example of a dynamic tab including a plurality of buttons associated with corresponding functions.

When the user 112 selects the Dynamic tab 409c, the web-based visual editor 402 preferably displays a plurality of groups having a plurality of buttons corresponding to functions. An example screen shot 900 of the groups and buttons displayed corresponding to the Dynamic tab is illustrated in FIG. 9. The Dynamic tab 409c preferably includes groups such as the Dynamic group 902 and the Table of Contents group 904.

The Dynamic group 902 preferably includes a plurality of buttons including a Dynamic Data button 428, Repeating Section button 906, a Simple Conditional button 908 and a Multi Conditional button 910. When the user 112 selects the Dynamic Data button 428, the web-based visual editor 402 preferably displays a floating dialog window that displays any XML data files used in the current dynamic document as discussed above.

When the user 112 selects the Repeating Section button 906, the web-based visual editor 402 preferably inserts a repeating loop around user selected content. When the user 112 selects the Simple Conditional button 908, the web-based visual editor 402 preferably inserts a conditional section around user selected content. When the user 112 selects the Multi Conditional button 910, the document editor preferably inserts a conditional section containing an else clause around user selected content.

In one example, the markup version of the dynamic document may is locally stored in the application server 106 before being converted and/or deployed to other users. For example, as illustrated in FIG. 4, the web-based visual editor 402 includes a Save Page button 18. In this example, when the user 112 selects the Save Page button 418, the current dynamic document page 408 is preferably stored in the designer terminal 102. In this example, when the user 112 selects the Save Page button 418, the application server 106 does not convert the markup version of the dynamic document to a stylesheet version of the dynamic document.

Although, the above illustrated example web-based visual editor 402 displays a plurality of panels of information in specific locations, it should be appreciated that many other configurations are possible. For example, the tabs, groups, or buttons could be in different locations, have different names, and have different graphical representations.

It should be understood that various changes and modifications to the presently preferred embodiments described herein will be apparent to those skilled in the art. Such changes and modifications can be made without departing from the spirit and scope of the present subject matter and The invention is claimed as follows:

1. A method of generating a dynamic document, the method comprising:
   providing a web-based visual editor structured to facilitate generation of a markup language version of the dynamic document, the markup language version of the dynamic document including first data indicative of a dynamic field;
   converting the markup language version of the dynamic document to a stylesheet version of the dynamic document, the stylesheet version of the dynamic document including second data indicative of the dynamic field;
   deploying the stylesheet version of the dynamic document via a network at an application server, wherein when the stylesheet version of the dynamic document is executed by a first user, a first instance of the dynamic document is generated using data associated with the first user as a first output document, and when the stylesheet version of the dynamic document is executed by a second different user, a second different instance of the dynamic document is generated using data associated with the second user as a second output document;
   transmitting the first output document to a first client device of the first user from the application server; and
   transmitting the second output document to a second client device of the second user from the application server,
   wherein the markup language version of the dynamic document is displayed as an XHTML page within a web browser at a designer terminal that provides the web-based visual editor, the stylesheet version of the dynamic document is an XSL:FO file stored at the application server, and the first and second output documents are at least one of PDF and RTF files stored locally at the first and second client devices, the client devices being located remotely from the application server.

2. The method of claim 1, wherein the web-based visual editor includes a drag-and-drop mechanism.

3. The method of claim 1, wherein the generation of the markup language version of the dynamic document includes:
   inserting the dynamic field into the dynamic document through a drag-and-drop mechanism;
   inserting an image through the drag-and-drop mechanism;
   inserting an XSL snippet through the drag-and-drop mechanism; and
   formatting properties of the dynamic document, the properties including color and font size.

4. The method of claim 1, wherein a designer terminal provides the web-based visual editor.

5. The method of claim 1, wherein the markup language version of the dynamic document includes at least one of an HTML file, an XHTML file, an XML file, and a WML file.

6. The method of claim 1, wherein the dynamic field is associated with an XML schema element.

7. The method of claim 1, including displaying a plurality of dynamic fields.

8. The method of claim 7, wherein a user is enabled to drag the dynamic field into the dynamic document through a drag-and-drop mechanism.

9. The method of claim 1, wherein the stylesheet version of the dynamic document includes an XSL stylesheet.

10. The method of claim 1, including enabling the first user to enter data after deploying the stylesheet version of the dynamic document.

11. The method of claim 1, wherein the data associated with the first user includes data entered by the first user.

12. The method of claim 1, including enabling the first user to create a logical expression using the web-based visual editor.

13. The method of claim 12, wherein the logical expression includes a repeating loop.

14. A dynamic document generator system, the system comprising:
   a display device;
   a processor operatively coupled to the display device;
   a memory device storing a plurality of instructions, which when the plurality of instructions are executed by the processor, cause the processor to:
   (a) provide a web-based visual editor structured to facilitate generation of a markup language version of the dynamic document, the markup language version of the dynamic document including first data indicative of a dynamic field;
   (b) convert the markup language version of the dynamic document to a stylesheet version of the dynamic document, the stylesheet version of the dynamic document including second data indicative of the dynamic field; and
   (c) deploy the stylesheet version of the dynamic document via a network, wherein when the stylesheet version of the dynamic document is executed by a first user, a first instance of the dynamic document is generated using data associated with the first user as a first output document, and when the stylesheet version of the dynamic document is executed by a second different user, a second different instance of the dynamic document is generated using data associated with the second user as a second output document,
   wherein the markup language version of the dynamic document is displayed as an XHTML page within a web browser at a designer terminal that provides the web-based visual editor, the stylesheet version of the dynamic document is an XSL:FO file stored at an application server, and the first and second output documents are at least one of PDF and RTF files stored locally at respective client devices of the first and second users, the client devices being located remotely from the application server.

15. The dynamic document generator system of claim 14, wherein the web-based visual editor includes a drag-and-drop mechanism.

16. A dynamic document generator system of claim 14, wherein when executed by the at least one processor, the plurality of instructions cause the at least one processor to operate with the at least one input device to:
   insert the dynamic field into the dynamic document through a drag-and-drop mechanism;
   insert an image through the drag-and-drop mechanism;
   insert an XSL snippet through the drag-and-drop mechanism; and
   format properties of the dynamic document, the properties including color and font size.

17. The dynamic document generator system of claim 14, wherein the markup language version of the dynamic document includes at least one of an HTML file, an XHTML file, an XML file, and a WML file.

18. The dynamic document generator system claim 14, wherein the dynamic field is associated with an XML schema element.

19. The dynamic document generator system of claim 14, including displaying a plurality of dynamic fields.

20. The dynamic document generator system of claim 19, wherein a user is enabled to drag the dynamic field into the dynamic document through a drag-and-drop mechanism.

21. The dynamic document generator system of claim 14, wherein the stylesheet version of the dynamic document includes an XSL stylesheet.

22. The dynamic document generator system of claim 14, wherein when executed by the at least one processor, the plurality of instructions cause the at least one processor to operate with the at least one input device to enable the first user to enter data after the stylesheet version of the dynamic document is deployed.

23. The dynamic document generator system of claim 14, wherein the data associated with the first user includes data entered by the user.

24. The dynamic document generator system of claim 14, wherein when executed by the at least one processor, the plurality of instructions cause the at least one processor to operate with the at least one input device to enable the first user to create a logical expression.

25. The dynamic document generator system of claim 24, wherein the logical expression includes a repeating loop.

26. A non-transitory machine readable media storing instructions structured to cause an apparatus to:
provide a web-based visual editor structured to facilitate generation of a markup language version of the dynamic document, the markup language version of the dynamic document including first data indicative of a dynamic field;
convert the markup language version of the dynamic document to a stylesheet version of the dynamic document, the stylesheet version of the dynamic document including second data indicative of the dynamic field; and
deploy the stylesheet version of the dynamic document via a network, wherein when the stylesheet version of the dynamic document is executed by a first user, the dynamic field is associated with a first instance of field data to generate a first output document, and when the stylesheet version of the dynamic document is executed by a second different user, the dynamic field is associated with a second different instance of field data to generate a second output document,
wherein the first output document and the second output document are in at least one of a PDF form and an RTF form that is outputted to respective client devices of the first and second users, and
wherein the markup language version of the dynamic document is displayed as an XHTML page within a web browser at a designer terminal that provides the web-based visual editor, the stylesheet version of the dynamic document is an XSL:FO file stored at an application server, and the first and second output documents are at least one of PDF and RTF files stored locally at respective client devices of the first and second users, the client devices being located remotely from the application server.

27. The non-transitory machine readable media of claim 26, wherein the web-based visual editor includes a drag-and-drop mechanism.

28. The non-transitory machine readable media of claim 26, wherein the instructions are further structured to cause an apparatus to:
insert the dynamic field into the dynamic document through a drag-and-drop mechanism;
insert an image through the drag-and-drop mechanism;
insert an XSL snippet through the drag-and-drop mechanism; and
format properties of the dynamic document, the properties including color and font size.

29. The non-transitory machine readable media of claim 26, wherein the markup language version of the dynamic document includes at least one of an HTML file, an XHTML file, an XML file, and a WML file.

30. The non-transitory machine readable media of claim 26, wherein the dynamic field is associated with an XML schema element.

31. The non-transitory machine readable media of claim 26, wherein the instructions are further structured to cause an apparatus to display a plurality of dynamic fields.

32. The non-transitory machine readable media of claim 31, wherein the instructions are further structured to cause an apparatus to enable a user to drag the dynamic field into the dynamic document through a drag-and-drop mechanism.

33. The non-transitory machine readable media of claim 26, wherein the stylesheet version of the dynamic document includes an XSL stylesheet.

34. The non-transitory machine readable media of claim 26, wherein the instructions are further structured to cause an apparatus to enable the first user to enter data after deploying the stylesheet version of the dynamic document.

35. The non-transitory machine readable media of claim 26, wherein the data associated with the first user includes data entered by the first user.

36. The non-transitory machine readable media of claim 26, wherein the instructions are further structured to cause an apparatus to enable the first user to create a logical expression using the web-based visual editor.

37. The non-transitory machine readable media of claim 36, wherein the logical expression includes a repeating loop.

38. The method of claim 1, wherein at least one of the first output document and the second output document is in at least one of a PDF form and an RTF form.

39. The method of claim 1, wherein the markup language version of the dynamic document is an XHTML file stored at a designer terminal that provides the web-based visual editor, the stylesheet version of the dynamic document is an XSL:FO file stored at an application server, and the first output document is a PDF file stored at the client devices.

40. The method of claim 1, wherein the markup language version of the dynamic document is stored at a designer terminal that provides the web-based visual editor, the stylesheet version of the dynamic document is stored at an application server, and the first output document is stored at the client devices.

41. The method of claim 1, wherein the markup language version of the dynamic document is stored in at least one of a designer terminal that provides the web-based visual editor and an application server, the stylesheet version of the dynamic document is stored at the application server, and the first output document is stored at the client devices.

42. The method of claim 1, wherein the markup language version of the dynamic document is stored in at least one of a designer terminal that provides the web-based visual editor, an application server, and the client devices.

43. The method of claim 1, wherein the markup language version of the dynamic document is stored at an application server and is not stored at a designer terminal that provides the web-based visual editor.

* * * * *